(12) United States Patent
Knott et al.

(10) Patent No.: US 11,498,996 B2
(45) Date of Patent: Nov. 15, 2022

(54) PROCESS FOR PRODUCING POLYOXYALKYLENE POLYSILOXANE BLOCK POLYMERS

(71) Applicant: Evonik Operations GmbH, Essen (DE)

(72) Inventors: Wilfried Knott, Essen (DE); Horst Dudzik, Essen (DE); Frauke Henning, Essen (DE); Philippe Favresse, Ratingen (DE)

(73) Assignee: Evonik Operations GmbH, Essen (DE)

( * ) Notice: Subject to any disclaimer, the term of this patent is extended or adjusted under 35 U.S.C. 154(b) by 408 days.

(21) Appl. No.: 15/929,836

(22) Filed: May 26, 2020

(65) Prior Publication Data
US 2020/0377640 A1 Dec. 3, 2020

(30) Foreign Application Priority Data
May 28, 2019 (EP) .................................... 19176879

(51) Int. Cl.
*C08F 293/00* (2006.01)
*C08G 77/10* (2006.01)

(52) U.S. Cl.
CPC ............ *C08F 293/00* (2013.01); *C08G 77/10* (2013.01)

(58) Field of Classification Search
CPC .................................. C08G 77/10; C08G 77/46
See application file for complete search history.

(56) References Cited

U.S. PATENT DOCUMENTS

| | | |
|---|---|---|
| 2,917,480 A | 12/1959 | Bailey et al. |
| 4,028,218 A | 6/1977 | Fink et al. |
| 4,274,977 A | 6/1981 | Koerner et al. |
| 5,147,965 A | 9/1992 | Ichinohe et al. |
| 5,371,161 A | 12/1994 | Knott |
| 5,455,367 A | 10/1995 | Klein et al. |
| 5,475,127 A | 12/1995 | Klein et al. |
| 6,291,622 B1 | 9/2001 | Dröse et al. |
| 6,307,082 B1 | 10/2001 | Klein et al. |
| 6,858,663 B2 | 2/2005 | Knott et al. |
| 7,018,458 B2 | 3/2006 | Knott et al. |
| 7,157,541 B2 | 1/2007 | Knott et al. |
| 7,442,724 B2 | 10/2008 | Esselborn et al. |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 7,838,603 B2 | 11/2010 | Schwab et al. |
| 8,022,150 B2 | 9/2011 | Esselborn et al. |
| 8,158,572 B2 | 4/2012 | Schubert et al. |
| 8,247,525 B2 | 8/2012 | Schubert et al. |
| 8,268,939 B2 | 9/2012 | Ebbrecht et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,420,748 B2 | 4/2013 | Henning et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,623,984 B2 | 1/2014 | Henning et al. |
| 8,722,836 B2 | 5/2014 | Knott et al. |
| 8,729,207 B2 | 5/2014 | Hartung et al. |
| 8,772,423 B2 | 7/2014 | De Gans et al. |
| 8,779,079 B2 | 7/2014 | Henning et al. |
| 8,796,198 B2 | 8/2014 | Henning et al. |
| 8,802,744 B2 | 8/2014 | Knott et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,969,502 B2 | 3/2015 | Knott et al. |
| 8,974,627 B2 | 3/2015 | Schubert et al. |
| 9,005,361 B2 | 4/2015 | Henning et al. |
| 9,068,044 B2 | 6/2015 | Schubert et al. |
| 9,115,335 B2 | 8/2015 | Trosin et al. |
| 9,315,614 B2 | 4/2016 | Schubert et al. |
| 9,334,354 B2 | 5/2016 | Ferenz et al. |
| 9,481,695 B2 | 11/2016 | Knott et al. |
| 9,540,500 B2 | 1/2017 | Ferenz et al. |
| 9,695,202 B2 | 7/2017 | Henning et al. |
| 9,738,797 B2 | 8/2017 | Nilewski et al. |
| 9,783,635 B2 | 10/2017 | Schubert et al. |
| 9,975,909 B2 | 5/2018 | Schubert et al. |
| 10,087,278 B2 | 10/2018 | Lobert et al. |
| 10,099,211 B2 | 10/2018 | Knott et al. |
| 10,399,051 B2 | 9/2019 | Favresse et al. |
| 10,399,998 B2 | 9/2019 | Knott et al. |
| 10,414,871 B2 | 9/2019 | Knott et al. |
| 10,414,872 B2 | 9/2019 | Knott et al. |
| 10,519,280 B2 | 12/2019 | Knott et al. |
| 10,526,454 B2 | 1/2020 | Knott et al. |
| 10,544,267 B2 | 1/2020 | Knott et al. |
| 10,752,735 B2 | 8/2020 | Knott et al. |
| 10,766,913 B2 | 9/2020 | Knott et al. |

(Continued)

FOREIGN PATENT DOCUMENTS

| | | |
|---|---|---|
| CN | 101100515 | 1/2008 |
| DE | 1012602 | 7/1957 |

(Continued)

OTHER PUBLICATIONS

European Search Report dated Nov. 8, 2019 in European Application No. 19186879.5.

*Primary Examiner* — Jeffrey C Mullis
(74) *Attorney, Agent, or Firm* — Grüneberg and Myers, PLLC

(57) ABSTRACT

SiOC-linked, linear polydimethylsiloxane-polyoxyalkylene block copolymers of formula (I) C—B-(AB)$_a$—C1 are produced by reaction of end-equilibrated α,ω-diacetoxypolydimethylsiloxanes with a mixture including at least one polyether polyol, preferably a polyether diol, and at least one polyether monool or at least one monohydric alcohol.

16 Claims, No Drawings

(56) References Cited

U.S. PATENT DOCUMENTS

| | | | |
|---|---|---|---|
| 10,954,344 | B2 | 3/2021 | Knott et al. |
| 11,021,575 | B2 | 6/2021 | Knott et al. |
| 11,066,429 | B2 | 7/2021 | Knott et al. |
| 11,220,578 | B2 | 1/2022 | Knott et al. |
| 11,279,804 | B2 | 3/2022 | Knott et al. |
| 11,286,351 | B2 | 3/2022 | Knott et al. |
| 11,286,366 | B2 | 3/2022 | Knott et al. |
| 2002/0161158 | A1 | 10/2002 | Burkhart et al. |
| 2004/186260 | A1 | 9/2004 | Hohenberg et al. |
| 2005/0075468 | A1 | 4/2005 | Knott et al. |
| 2006/0241270 | A1 | 10/2006 | Burkhart et al. |
| 2007/0128143 | A1 | 6/2007 | Gruning et al. |
| 2007/0299231 | A1 | 12/2007 | Doehler et al. |
| 2008/0125503 | A1 | 5/2008 | Henning et al. |
| 2009/0137751 | A1 | 5/2009 | Knott et al. |
| 2009/0137752 | A1 | 5/2009 | Knott et al. |
| 2010/0022435 | A1 | 1/2010 | Henning et al. |
| 2010/0029861 | A1* | 2/2010 | Esselborn .............. C08L 83/12 525/474 |
| 2010/0081781 | A1 | 4/2010 | Schubert et al. |
| 2011/0190190 | A1 | 8/2011 | Schubert et al. |
| 2011/0230619 | A1 | 9/2011 | Kuppert et al. |
| 2011/0301254 | A1 | 12/2011 | Knott et al. |
| 2012/0037036 | A1 | 2/2012 | Veit et al. |
| 2012/0046486 | A1 | 2/2012 | Henning et al. |
| 2012/0068110 | A1 | 3/2012 | Schubert et al. |
| 2012/0190760 | A1 | 7/2012 | Henning et al. |
| 2012/0190762 | A1 | 7/2012 | Hubel et al. |
| 2013/0041115 | A1 | 2/2013 | Knott et al. |
| 2013/0245304 | A1 | 9/2013 | Schubert et al. |
| 2013/0345318 | A1 | 12/2013 | Schubert et al. |
| 2014/0094532 | A1 | 4/2014 | Knott et al. |
| 2014/0256844 | A1 | 9/2014 | Henning et al. |
| 2015/0004112 | A1 | 1/2015 | Ritter et al. |
| 2015/0004113 | A1 | 1/2015 | Ritter et al. |
| 2015/0080593 | A1 | 3/2015 | Henning et al. |
| 2016/0130290 | A1 | 5/2016 | Knott et al. |
| 2016/0160009 | A1 | 6/2016 | Ferenz et al. |
| 2016/0213600 | A1 | 7/2016 | Klostermann et al. |
| 2017/0226285 | A1 | 8/2017 | Lobert et al. |
| 2017/0274335 | A1 | 9/2017 | Favresse et al. |
| 2018/0016392 | A1 | 1/2018 | Lobert et al. |
| 2018/0134850 | A1 | 5/2018 | Knott et al. |
| 2018/0258228 | A1 | 9/2018 | Amajjahe et al. |
| 2019/0040205 | A1* | 2/2019 | Knott .................... C08L 83/04 |
| 2019/0100625 | A1 | 4/2019 | Knott et al. |
| 2019/0112502 | A1 | 4/2019 | Sloot et al. |
| 2020/0055991 | A1 | 2/2020 | Knott et al. |
| 2020/0055992 | A1* | 2/2020 | Knott .................... C08G 77/46 |
| 2020/0377524 | A1 | 12/2020 | Knott et al. |
| 2020/0377525 | A1 | 12/2020 | Knott et al. |
| 2020/0377663 | A1* | 12/2020 | Favresse ............... C08L 83/06 |
| 2020/0377666 | A1 | 12/2020 | Knott et al. |
| 2020/0377686 | A1 | 12/2020 | Knott et al. |
| 2021/0130551 | A1 | 5/2021 | Knott et al. |
| 2021/0163751 | A1 | 6/2021 | Cavaleiro et al. |
| 2021/0253780 | A1 | 8/2021 | Wessely et al. |
| 2021/0253799 | A1 | 8/2021 | Knott et al. |
| 2021/0301099 | A1 | 9/2021 | Knott et al. |
| 2021/0371598 | A1 | 12/2021 | Knott et al. |
| 2022/0047969 | A1 | 2/2022 | Schierle et al. |
| 2022/0177652 | A1 | 6/2022 | De Gans et al. |

FOREIGN PATENT DOCUMENTS

| | | |
|---|---|---|
| DE | 24 43 853 | 1/1976 |
| DE | 2829906 | 3/1979 |
| DE | 4116987 C1 | 7/1992 |
| DE | 10312636 | 9/2004 |
| DE | 10359764 | 7/2005 |
| DE | 10 2005 001039 | 7/2006 |
| DE | 10 2005 039398 | 2/2007 |
| DE | 10 2006 061353 | 6/2008 |
| DE | 10 2007 035646 | 1/2009 |
| DE | 10 2007 055485 | 6/2009 |
| DE | 10 2007 057146 | 6/2009 |
| DE | 10 2005 057857 | 2/2010 |
| DE | 10 2008 041601 | 3/2010 |
| DE | 10 2008 043343 | 5/2010 |
| DE | 10 2009 022628 | 6/2010 |
| DE | 10 2009 022627 | 12/2010 |
| DE | 10 2009 022630 | 12/2010 |
| DE | 10 2009 022631 | 12/2010 |
| DE | 10 2010 001350 | 8/2011 |
| DE | 10 2010 002178 | 8/2011 |
| DE | 10 2010 002180 | 8/2011 |
| DE | 10 2011 003148 | 7/2012 |
| DE | 10 2011 109540 | 2/2013 |
| DE | 202010017915 U1 | 3/2013 |
| DE | 10 2011 088787 | 6/2013 |
| DE | 10 2014 200106 | 8/2014 |
| DE | 10 2013 204605 | 9/2014 |
| DE | 10 2013 208328 | 11/2014 |
| DE | 10 2013 106906 | 1/2015 |
| DE | 10 2013 214081 | 1/2015 |
| DE | 10 2013 216751 | 2/2015 |
| EP | 0 475 440 | 3/1992 |
| EP | 0 600 266 | 6/1994 |
| EP | 0 621 280 | 10/1994 |
| EP | 0 679 653 | 11/1995 |
| EP | 1 013 701 | 6/2000 |
| EP | 1 031 603 | 8/2000 |
| EP | 1 350 804 | 10/2003 |
| EP | 1 382 632 | 1/2004 |
| EP | 1 382 633 | 1/2004 |
| EP | 1 431 331 | 6/2004 |
| EP | 1 439 200 | 7/2004 |
| EP | 1 520 870 | 4/2005 |
| EP | 1 529 821 | 5/2005 |
| EP | 1 754 740 | 2/2007 |
| EP | 1 757 637 | 2/2007 |
| EP | 1 792 609 | 6/2007 |
| EP | 1 873 209 | 1/2008 |
| EP | 1 894 961 | 3/2008 |
| EP | 1 935 920 | 6/2008 |
| EP | 1 935 922 | 6/2008 |
| EP | 1 935 923 | 6/2008 |
| EP | 2 107 077 | 10/2009 |
| EP | 2 138 526 | 12/2009 |
| EP | 2 159 248 | 3/2010 |
| EP | 2 174 971 | 4/2010 |
| EP | 2 182 020 | 5/2010 |
| EP | 2 194 086 | 6/2010 |
| EP | 2 196 487 | 6/2010 |
| EP | 2 261 273 | 12/2010 |
| EP | 2 289 961 | 3/2011 |
| EP | 2 289 976 | 3/2011 |
| EP | 2 354 177 | 8/2011 |
| EP | 2 363 422 | 9/2011 |
| EP | 2 365 021 | 9/2011 |
| EP | 2 392 608 | 12/2011 |
| EP | 2 404 950 | 1/2012 |
| EP | 2 418 234 | 2/2012 |
| EP | 2 444 447 | 4/2012 |
| EP | 2 481 766 | 8/2012 |
| EP | 2 481 770 | 8/2012 |
| EP | 2 094 761 | 10/2012 |
| EP | 2 524 938 | 11/2012 |
| EP | 259 001 | 12/2012 |
| EP | 2 554 573 | 2/2013 |
| EP | 2 557 107 | 2/2013 |
| EP | 2 607 429 | 6/2013 |
| EP | 2 607 437 | 6/2013 |
| EP | 2 628 763 | 8/2013 |
| EP | 2 653 205 | 10/2013 |
| EP | 2 676 986 | 12/2013 |
| EP | 2 778 170 | 9/2014 |
| EP | 2 821 429 | 1/2015 |
| EP | 2 821 430 | 1/2015 |
| EP | 2 826 806 | 1/2015 |
| EP | 2 840 104 | 2/2015 |
| EP | 3 029 087 | 6/2016 |
| EP | 3 047 845 | 7/2016 |

(56) References Cited

FOREIGN PATENT DOCUMENTS

| | | |
|---|---|---|
| EP | 3 050 910 | 8/2016 |
| EP | 3 168 274 | 5/2017 |
| EP | 3 202 816 | 8/2017 |
| EP | 3 262 104 | 1/2018 |
| EP | 3 272 331 | 1/2018 |
| EP | 3 401 353 | 11/2018 |
| EP | 3 415 547 | 12/2018 |
| EP | 3 415 548 | 12/2018 |
| EP | 3 434 737 | 1/2019 |
| EP | 3 438 158 | 2/2019 |
| EP | 3438158 | 2/2019 |
| EP | 3 467 006 | 4/2019 |
| EP | 3 611 214 | 2/2020 |
| EP | 3 611 215 | 2/2020 |
| EP | 3 744 753 | 12/2020 |
| EP | 3 744 754 | 12/2020 |
| EP | 3 744 755 | 12/2020 |
| EP | 3 744 756 | 12/2020 |
| EP | 3 744 759 | 12/2020 |
| EP | 3 744 760 | 12/2020 |
| EP | 3 744 761 | 12/2020 |
| EP | 3 744 774 | 12/2020 |
| EP | 3 865 527 | 8/2021 |
| EP | 3 865 531 | 8/2021 |
| EP | 3 885 096 | 9/2021 |
| EP | 3 919 550 | 12/2021 |
| EP | 3 954 740 | 2/2022 |
| EP | 4 011 992 | 6/2022 |
| JP | S48-19941 B1 | 6/1973 |
| WO | 02/068506 | 9/2002 |
| WO | 2011/094374 | 8/2011 |
| WO | 2016/134538 | 9/2016 |

\* cited by examiner

PROCESS FOR PRODUCING POLYOXYALKYLENE POLYSILOXANE BLOCK POLYMERS

CROSS-REFERENCE TO RELATED APPLICATION

The present application claims the benefit to European application EP 19176879.5, filed on May 28, 2019, the content of which is hereby incorporated by reference in its entirety.

BACKGROUND OF THE INVENTION

Field of the Invention

The invention relates to a process for producing SiOC-linked, linear polydimethylsiloxane-polyoxyalkylene block copolymers of the structural type C—B-(AB)$_a$—C1 and also to the use thereof as constituents in interface-active substances, such as in PU foam stabilizers, defoamers, deaerating agents, emulsifiers, demulsifiers and paint and levelling additives.

Discussion of the Background

The terms "siloxanes" and "polysiloxanes" are used as synonyms in the present invention.

The term "defoamer" in the present case encompasses both products and formulations that prevent foam and also those that destroy foam and enable deaeration. In practice, the transitions between these product properties are blurred, so that here the common collective term defoamer is used.

In many industrial processes, in particular when work is being carried out in aqueous media, it is necessary to repress or to completely prevent the undesired formation of foam during the production or processing operations, since foam or heads of foam which form during stirring and dispersing operations or form in the containers during the filling operation can lengthen the production times or reduce the effective volume of the plant or even prevent correct operation thereof, in that overflowing of the formulation out of the mixing tank cannot be avoided and a lack of colour transfer during the application thereof is unavoidable.

This can be achieved by adding defoamers which even at very low use concentrations of from approximately 0.001% by weight are capable of avoiding or destroying undesired foams and which at the same time do not cause any surface defects after application of the systems and suppress air inclusions in the paint. In practice, these aspects must be taken into account at least just as much as good defoaming.

Surface defects are to be understood to be features that are undesirable to the user such as for example pinholes, craters, loss of gloss, orange peel effect, wrinkling and loss of adhesion in the coating system. However, an appropriate long-term stability of the defoamer in formulations is also of high importance to the user since products such as paints are often not used up immediately but instead sometimes only after a relatively long storage. In the case of storage under extreme climatic conditions (heat and solar irradiation), the efficacy of a defoamer formulation can occasionally collapse after only a short time.

Defoamers according to the related art are for example silicone oils, native oils, paraffin and mineral oils, but also hydrophobic polyoxyalkylenes, long-chain alcohols and also mixtures of these products with one another and emulsions thereof.

Defoamers for defoaming aqueous and non-aqueous media and comprising polyoxyalkylene polysiloxane polymers as the active agent with a crucial influence on the defoaming exhibit particular efficacy and storage stability. This includes foam inhibition, defoaming, very good long-term stability, and also outstanding compatibility in aqueous and non-aqueous media. All of these properties are of high importance for modem paint applications.

For the purposes of increasing the efficacy, what are known as hydrophobic solids are frequently also added in amounts of 0.1% to 10% by weight, which promote dewetting processes in a targeted manner at foam lamellae and hence assist the foam collapse very effectively. Suitable hydrophobic solids are corresponding hydrophobized or non-hydrophobized silicas, hydrophobized or non-hydrophobized precipitated silica, metal carboxylates such as metal stearates, polyolefins and natural or synthetic waxes such as paraffin waxes, polyolefin waxes, amide waxes and urea or poly(urea.$), such as described for example in DE 28 29 906 A1.

By means of addition of suitable emulsifiers or protective colloids, such defoamer formulations can also be converted into aqueous emulsions which can be additized more simply in paint formulations in terms of application. CN 101100515 A discusses a specific emulsification process, which can likewise be used for the emulsification of the polyether polysiloxane polymers.

It is likewise known to use polyoxyalkylene polysiloxane block copolymers as defoaming agents. For instance, DE 1 012 602 by way of example describes polyoxyalkylene polysiloxane polymers having an A'-B'-A' structure, where A' denotes the polyoxyalkylene blocks and B' denotes a polysiloxane block. These active agents are assigned to the so-called SiOC polyethersiloxane defoamer substance class.

DE 24 43 853 describes defoaming preparations which comprise not only linear but also branched polyoxyalkylene polysiloxane block copolymers.

U.S. Pat. No. 4,028,218 describes a process for preventing or destroying foam in aqueous solutions or dispersions, which uses a similar preparation as that described in DE 24 43 853. The preparation essentially differs in an additional content of organic oil which likewise has a defoaming action. Suitable organic oils are the esters of alcohols and fatty acids, such as for example vegetable or animal oils, mineral oils, polybutadiene oils or polypropylene glycols.

According to the current state of the art, a plurality of process variants is used for the production of the economically important substance class of the SiOC-linked polyethersiloxanes, also referred to as silicone polyethers or polysiloxane polyether copolymers.

It is known to those skilled in the art that these SiOC-linked polyethersiloxanes are a product class which does not have a tendency to resinify. Even if SiOC-linked polyethersiloxanes contain reactive groups such as hydroxy groups, they are not used for the targeted crosslinking. In contrast to silicone resins, they are not film-forming.

SiOC-linked polyethersiloxanes are classically formed by the reaction of a polysiloxane having a leaving group (e.g. halogen) bonded to the silicon atom and an alcohol or polyetherol. The latter is typically obtained beforehand by alkoxylation of hydroxy-functional starter compounds such as for example methanol, butanol or glycol with alkylene oxides. Chlorine as leaving group on the silicon atom is in particular known and widespread as starting compounds for this type of reaction. However, chlorosiloxanes and chloropolysiloxanes are difficult to handle as they are extremely reactive. The use thereof is additionally associated with the disadvantage that hydrogen chloride formed in the course of the reaction necessitates corrosion-resistant installations and results in both technical and environmental challenges. Moreover, organic chlorine compounds which are undesirable for toxicological reasons can also be formed in the presence of chloropolysiloxanes and alcohols or polyetherols, such that in the production process there are the requirements of suppressing and destroying these. As is known to those skilled in the art, it is also necessary in the case of the reaction of a chlorosiloxane with an alcohol or polyetherols to achieve and to ensure a quantitative conversion, with the result that the OH-functional component often needs to be used in a stoichiometric excess based on the chlorine leaving group of the polysiloxane component. In practice, the use of a polyether excess means that the polyethersiloxanes thus produced unavoidably contain relatively large amounts of unreacted excess poly ethers which lower the concentration of the active polyethersiloxane component and impair the performance properties of the polyethersiloxanes. It is frequently additionally necessary to use HCl scavengers in the above-described process in order to achieve suitable quantitative conversions. The use of HCl scavengers results in the formation of large quantities of salt, the removal of which on an industrial scale causes problems.

Defoamers for defoaming aqueous and non-aqueous media and comprising linearly structured polyoxyalkylene polysiloxane block copolymers as the active agent with a crucial influence on the defoaming exhibit particular efficacy and stability. This includes foam inhibition, defoaming, very good long-term stability, and also outstanding compatibility in aqueous and non-aqueous media All of these factors are of great importance for modern processes in the field of surface technology.

EP 2094761 B1 describes polyoxyalkylene-polysiloxane block polymers and a process for the production thereof by reaction of the alcohol components with chloropolysiloxanes.

The chloropolysiloxanes used in this document are linear structures with α,ω chlorine functionality, with a mixture of the cycles D4 and D5 being mixed in a defined quantitative ratio with dimethyldichlorosilane, possibly with the addition of water to control the chain length, and being further equilibrated by means of addition of what is known as an equilibration catalyst, such as for example sulfuric acid, methanesulfonic acid, trifluoromethanesulfonic acid or iron (III) chloride. EP 2094761 B1 further states that in the case of the preferred use of iron(III) chloride as catalyst for the preparation of the linear α,ω-dichlorosiloxanes, prior removal of the catalyst using activated carbon is recommended in order to preclude undesired discolorations as a result of the presence of the iron catalyst.

One possible alternative to this process comprises reacting alcohols or polyetherols with hydrosiloxanes in which hydrogen is directly bonded to the silicon. Under suitable conditions the formation of the SiOC bond here results merely in elimination of hydrogen. This process, known as dehydrogenative condensation, can be performed exclusively only in the presence of a catalyst. U.S. Pat. No. 5,147,965 refers to a process described in the Japanese patent publication JPS 4819941, in which a hydrosiloxane is reacted with an alcohol with the addition of alkali metal hydroxides or alkali metal alkoxides. A disadvantage with this process is that the catalysts have to be neutralized after reaction is complete and the salt load formed in the process, although it is much lower than that of the chlorosiloxane process, nevertheless requires complicated removal by filtration.

EP 0 475 440 describes a process in which hydrosiloxanes are reacted with an alcohol with addition of an organic acid in the presence of a Pt salt. The reaction unavoidably requires the use of large amounts of organic acid (0.1 to 1 mol based on alcohol), toluene as solvent and a platinum salt. Since both toluene and acid are undesirable in the end product, they must be removed in turn after the end of the reaction. In addition, platinum salts are not only expensive but also not unproblematic from a physiological viewpoint. Specifically in the cosmetics industry sector, there is a demand for platinum-free products.

The process described in J. Boyer, R. J. P. Corriu, R. Perz, C. Reye, J. Organomet. Chem. 1978, 157, 153-162 does not require the use of heavy metals. Salts such as potassium tartrate, phthalate or formate for example are used as heterogeneous catalysts. However, the reactions require equimolar use of the salts based on the SiH units and are successful only at high temperatures of approx. 180° C. Both the drastic conditions and the large quantities of salt required render this process unattractive for the technical and industrial scale.

Patent applications DE 10 312 636 and DE 10 359 764 utilize boron-containing catalysts for the dehydrogenative condensation of hydrosiloxanes and alcohols. As much as these dehydrogenative processes for SiOC linking are attractive, specifically in relation to the avoidance of liquid and/or solid by-products, both the use of costly and toxic catalysts such as for example tris(pentafluorophenyl)borane and the safe handling of the hydrogen gas formed in the synthesis stand in the way of widespread application of the technology on an industrial scale.

SUMMARY OF THE INVENTION

The present invention is therefore based on the object of providing a process for producing linear SiOC-linked poly ethersiloxane block copolymers of the structural type C—B-(AB)$_a$—C1 which do not exhibit any of the disadvantages known from the related art with respect to the use of the chlorosiloxane. The present invention includes the following embodiments:

1. Process for producing SiOC-linked, linear polydimethylsiloxane-polyoxyalkylene block copolymers of general formula (I)

$$\text{C—B-(AB)}_a\text{—C1} \qquad (I)$$

in which

A=a polyoxyalkylene block of the general formula $(C_nH_{2n}O)_b$—,

B=a polysiloxane block of the general formula $(SiR_2O)_c$—,

C, C1=identical or different alkoxypolyoxyalkylene radicals of general formula (II)

$$\text{Z—O—[CH}_2\text{—CH(R}^1\text{)O]}_d\text{—} \qquad (II)$$

where Z=an alkyl, alkylene, aryl or alkylaryl radical, or

C, C1=an alkyl radical with the proviso that C or C1 possesses an alkoxypolyoxyalkylene radical of general formula (II) where Z=hydrogen, or C, C1=identical or different alkoxypolyoxyalkylene radicals of general formula (II) where Z=a hydrogen with the proviso that C or C1 possesses an alkoxypolyoxyalkylene radical of general formula (II) where Z=an alkyl, alkylene, aryl or alkylaryl radical, R=identical or different $C_{1-4}$-alkyl radicals or phenyl radicals with the proviso that at least 90% of the radicals R are methyl radicals, $R^1$=identical or different hydrogen radicals, $C_{1-12}$-alkyl radicals or phenyl radicals, a=1 to 20, b=an average value of from 10 to 130, c=3 to 100, d=independently of one another in C/C1 values of from 2 to 20 with the proviso that the average value is in the range from 2 to <15, n=2 to 12 with an average numerical value of from 2.7 to 4.0, characterized in that end-equilibrated α,ω-diacetoxypolydimethylsiloxanes are reacted with a mixture consisting of at least one polyether polyol, preferably a polyether diol, and at least one polyether monool or at least one monohydric alcohol.

2. Process according to embodiment 1, characterized in that end-equilibrated α,ω-diacetoxypolydimethylsiloxanes of formula (III) below

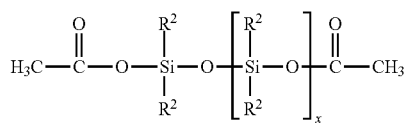
(III)

where $R^2$ is an alkyl radical having 1 to 4 carbon atoms or a phenyl radical, but preferably more than 90% of the radicals $R^2$ are methyl radicals and x=2≤x≤250, preferably 5≤x≤100, particularly preferably 10≤x≤30, are used.

3. Process according to embodiment 1 or 2, characterized in that the end-equilibrated, α,ω-diacetoxypolydimethylsiloxanes of formula (III) are obtainable from the reaction of silanes and/or siloxanes bearing alkoxy groups, and/or silanes and/or siloxanes bearing hydroxy groups, and/or simple siloxane cycles and/or DT cycles, with acetic anhydride, superacid, in particular trifluoromethanesulfonic acid, and acetic acid.

4. Process according to any of embodiments 1 to 3, characterized in that, for the production of the end-equilibrated α,ω-diacetoxypolydimethylsiloxanes of formula (III), a silane and/or siloxane bearing alkoxy groups and containing at least one T and/or Q group, and/or DT cycles are used.

5. Process according to any of embodiments 1 to 4, characterized in that, for component A of formula (I), polyether polyols selected from polyether dials, polyether polyols or mixtures of polyether diols and polyether polyols are used.

6. Process according to any of embodiments 1 to 4, characterized in that, for component C, C1 of formula (I), a polyether monool or a monohydric C1-C18 alcohol selected from methanol, ethanol, propanol, isopropanol, butanol, isobutanol is used.

7. Process according to any of the preceding embodiments, characterized in that the molar ratio of end-equilibrated α,ω-diacetoxypolydimethylsiloxanes to the mixture consisting of at least one polyether polyol, preferably a polyether diol, and at least one polyether monool or at least one monohydric alcohol is in the range from 1.01 to 3.00, preferably in the range from 1.01 to 2.00, very particularly preferably in the range 1.01 to 1.50.

8. Process according to any of the preceding embodiments, characterized in that the reaction with a mixture consisting of at least one polyether polyol, preferably a polyether diol, and at least one polyether monool or at least one monohydric alcohol is conducted at temperatures of 20° C. to 180° C., preferably at temperatures of 60° C. to 150° C.

9. Process according to any of the preceding embodiments, characterized in that the bases to be used are selected from the alkali metal and/or alkaline earth metal carbonates and/or hydrogen carbonates and/or amines, very particularly preferably gaseous ammonia.

10. Process according to any of the preceding embodiments, characterized in that inert solvents used are alkanes, cycloalkanes, alkyl aromatics, end-capped polyethers and/or emollient esters, such as the esters derived from lauric acid, myristic acid, palmitic acid, stearic acid, oleic acid, isostearic acid, ricinoleic acid and behenic acid combined with cetyl, stearyl, isostearyl, oleyl, octyldodecyl, myristyl and behenyl alcohol or glycerol, preferably myristyl myristate.

11. Process according to any of the preceding embodiments, characterized in that the reaction with a mixture consisting of at least one polyether polyol, preferably a polyether diol, and at least one polyether monool or at least one monohydric alcohol is effected solventlessly.

12. Process according to any of the preceding embodiments, characterized in that the weight-average molecular weight of each polysiloxane block (B) is between 650 to 6500 g/mol, preferably 800 to 1500 g/mol, particularly preferably 1000 to 1200 g/mol.

13. Process according to any of the preceding embodiments, characterized in that the polydimethylsiloxane-polyoxyalkylene block copolymer has a weight-average molecular weight of at least 2000 g/mol to approx. 160 000 g/mol, preferably 4000 g/mol to approx. 50 000 g/mol, in particular 5000 g/mol to approx. 36 000 g/mol.

14. SiOC-linked, linear polydimethylsiloxane-polyoxyalkylene block copolymers of formula (I) produced by a process according to any of embodiments 1 to 13.

15. Use of the SiOC-linked, linear polydimethylsiloxane-polyoxyalkylene block copolymers according to embodiment 14 as interface-active additives for the production of PU foam stabilizers, defoamers, deaerating agents, emulsifiers, demulsifiers and paint and levelling additives.

16. Use of the SiOC-linked, linear polydimethylsiloxane-polyoxyalkylene block copolymers according to embodiment 14 for the production of diesel defoamers, of hydrophobizing agents, of polymer dispersions, of adhesives or sealants, of paper towels; of cleaning and care formulations for the household or for industrial applications, in particular for the production of fabric softeners, of cosmetic, pharmaceutical and dermatological compositions, in particular cosmetic cleansing and care formulations, hair treatment agents and hair aftertreatment agents; of construction material compositions, of thermoplastic shaped bodies.

17. Use of the SiOC-linked, linear polydimethylsiloxane-polyoxyalkylene block copolymers according to embodiment 14 as processing aid in the extrusion of thermoplastics, as adjuvant in crop protection, as additive for the cleaning and care of hard surfaces, for the surface treatment of fibres, particles or fabrics, in particular for the finishing or impregnation of textiles, or in the coating of fillers.

DETAILED DESCRIPTION OF THE INVENTION

It has now been found that, surprisingly, a simple chlorine-free route to polyoxyalkylene polysiloxane block copolymers of general formula (I)

$$C-B-(AB)_a-C1 \quad (I)$$

in which
A=a polyoxyalkylene block of the general formula $(C_nH_{2n}O)_b-$,
B=a polysiloxane block of the general formula $(SiR_2O)_c-$,
C, C1=identical or different alkoxypolyoxyalkylene radicals of general formula (II)

$$Z-O-[CH_2-CH(R^1)O]_d- \quad (II)$$

where Z=an alkyl, alkylene, aryl or alkylaryl radical,
or
C, C1=an alkyl radical with the proviso that C or C1 possesses an alkoxypolyoxyalkylene radical of general formula (II) where Z=hydrogen,
or
C, C1=identical or different alkoxypolyoxyalkylene radicals of general formula (II) where Z=a hydrogen with the proviso that C or C1 possesses an alkoxypolyoxyalkylene radical of general formula (II) where Z=an alkyl, alkylene, aryl or alkylaryl radical,
R=identical or different $C_{1-4}$-alkyl radicals or phenyl radicals with the proviso that at least 90% of the radicals R are methyl radicals,
$R^1$=identical or different hydrogen radicals, $C_{1-12}$-alkyl radicals or phenyl radicals,
a=1 to 20,
b=an average value of from 10 to 130,
c=3 to 100,
c=3 to 100,
d=independently of one another in C/C1 values of from 2 to 20 with the proviso that the average value is in the range from 2 to <15,
n=2 to 12 with an average numerical value of from 2.7 to 4.0,
is opened up by reacting end-equilibrated α,ω-diacetoxypolydimethylsiloxanes with a mixture consisting of at least one polyether polyol, preferably a polyether diol, and at least one polyether monool or at least one monohydric alcohol.

Preferably, end-equilibrated α,ω-diacetoxypolydimethylsiloxanes of formula (III) below $$H_3C-\overset{O}{\underset{\|}{C}}-O-\underset{\underset{R^2}{|}}{\overset{\overset{R^2}{|}}{Si}}-O\left[\underset{\underset{R^2}{|}}{\overset{\overset{R^2}{|}}{Si}}-O\right]_x\overset{O}{\underset{\|}{C}}-CH_3 \quad (III)$$

where
$R^2$ is an alkyl radical having 1 to 4 carbon atoms or a phenyl radical, but preferably more than 90% of the radicals $R^2$ are methyl radicals and
x=2≤x≤250, preferably 5≤x≤100, particularly preferably 10≤x≤30,
are used.

Routes to acetoxy-functional polysiloxanes are described in the literature. The as-yet unpublished European patent applications having the application reference numbers EP 18172882.5, EP 18172876.7, EP 18189072.4, EP 17195510.7, EP 17204277.2, EP 18189073.2 and EP 18210035.4 address the preparation of trifluoromethanesulfonic acid-acidified, equilibrated acetoxysilanes of linear structural type.

Cited as a reference in relation to the M, D, T, Q nomenclature used in the context of this document to describe the structural units of organopolysiloxanes is W. Noll, Chemie and Technologie der Silicone [Chemistry and Technology of the Silicones], Verlag Chemie GmbH, Weinheim (1960), page 2 ff.

Following the teaching of EP 18189073.2, for example, cyclic polysiloxanes, in particular comprising D4 and/or D5, and/or mixtures of cyclic branched polysiloxanes of D/T type are reacted with acetic anhydride while using trifluoromethanesulfonic acid as catalyst and with addition of acetic acid. In addition, EP 18189073.2 states that both mixtures of cyclic branched polysiloxanes of D/T type, which consist exclusively of polysiloxanes having D and T units and whose cumulative proportion, determinable with 29Si NMR spectroscopy, of D and T units present in the siloxane matrix and having Si-alkoxy and/or SiOH groups is less than 2 mole percent, preferably less than 1 mole percent, and which additionally advantageously contain at least 5% by weight of siloxane cycles, such as preferably octamethylcyclotetrasiloxane (D4), decamethylcyclopentasiloxane (D5) and/or mixtures thereof, and also mixtures of cyclic branched siloxanes having exclusively D and T units, whose cumulative proportion, determinable with 29Si NMR spectroscopy, of D and T units present in the siloxane matrix and having Si-alkoxy and/or SiOH groups is greater than 2 and less than 10 mole percent, are particularly well suited for the production of end-equilibrated polysiloxanes having acetoxy functions.

The as-yet unpublished European application document 18210035.4 likewise describes (i) reaction systems for the production of polysiloxanes bearing acetoxy functions, comprising a) silanes and/or polysiloxanes bearing alkoxy groups and/or b) silanes and/or polysiloxanes bearing acetoxy groups, c) silanes and/or polysiloxanes bearing hydroxy groups, d) optionally simple polysiloxane cycles and/or DT cycles, e) a reaction medium, comprising acetic anhydride, perfluoroalkanesulfonic acid and preferably acetic acid, (ii) a process for producing linear or branched polysiloxanes bearing acetoxy functions. According to the application identified above, it is for example possible to arrive at a branched polysiloxane bearing terminal acetoxy groups by reacting a branched polysilicone equilibrate (=pre-equilibrate) bearing terminal alkoxy groups as sole reactant with a reaction medium consisting of acetic anhydride, trifluoromethanesulfonic acid and acetic acid.

It is preferably conceivable for polysiloxanes having Q units to also be used in addition to polysiloxanes having D and T units, with the proviso that in these mixtures the proportion of Si atoms coming from Q units amounts to ≤10% by mass to ≥0% by mass, preferably ≤5% by mass to ≥0% by mass, wherein the lower limit may be >0 or=0% by mass, but is especially >0% by mass, in each case based on the entirety of all Si atoms.

The provision of mixtures of cyclic branched polysiloxanes of D/T type, which in addition to polysiloxanes having D and T units also contain those having Q units, is readily possible for those skilled in the art for example in analogy to the teaching of the documents mentioned using for example silicic esters yielding Q units (Si(OR)4).

The end-equilibrated α,ω-diacetoxypolydimethylsiloxanes of formula (III) below are preferably obtainable from the reaction of
- silanes and/or siloxanes bearing alkoxy groups, and/or
- silanes and/or siloxanes bearing hydroxy groups, and/or
- simple siloxane cycles and/or DT cycles,
- with acetic anhydride, superacid, in particular trifluoromethanesulfonic acid, and acetic acid.

Preferably, for the production of the end-equilibrated α,ω-diacetoxypolydimethylsiloxanes of formula (III) below, a same and/or siloxane bearing alkoxy groups and containing at least one T and/or Q group, and/or DT cycles can be used.

In a preferred embodiment of the invention, acetic acid is added in amounts of 0.4 to 3.5 percent by weight, with preference 0.5 to 3 percent by weight, preferably 0.8 to 1.8 percent by weight, particularly preferably in amounts of 1.0 to 1.5 percent by weight, based on the reaction matrix consisting of acetic anhydride and cyclic polysiloxanes, comprising D4 and/or D5, or consisting of acetic anhydride and mixtures of cyclic branched polysiloxanes of D/T type, optionally also having Q units, or consisting of cyclic polysiloxanes, comprising D4 and/or D5, and mixtures of cyclic branched polysiloxanes of D/T type.

In a preferred embodiment of the invention, the catalyst trifluoromethanesulfonic acid is used in amounts of 0.1 to 1.0 percent by mass, preferably 0.1 to 0.3 percent by mass, based on the reaction matrix consisting of acetic anhydride and cyclic polysiloxanes, especially comprising D4 and/or D5, and/or cyclic branched poly siloxanes of D/T type, optionally also having Q units.

The term "end-equilibrated" is to be understood as meaning that the equilibrium established at a temperature of 23° C. and a pressure of 1013.25 hPa has been reached. The indicator of attaining the equilibrium employed may be the total cycles content determined by gas chromatography and defined as the sum total of the D4, D5, and D6 contents, based on the siloxane matrix and ascertained after derivatization of the α,ω-diacetoxypolydimethylpolysiloxanes to give the corresponding α,ω-diacetoxypolydimethylpolysiloxanes or after the derivatization of the branched acetoxypolysiloxanes to give the corresponding branched isopropoxysiloxanes. The inventive use of the acetic acid makes it possible here to undershoot without problems otherwise customary equilibrium proportions of about 8 percent by weight for the total cycles content in the branched acetoxypolysiloxanes. It accordingly corresponds to a preferred embodiment when equilibrium proportions of the total cycles content of less than 8, preferably less than 7 percent by weight are undershot in the branched acetoxypolysiloxanes. The derivatization to give the branched isopropoxypolysiloxanes is chosen here deliberately in order to prevent a thermally induced redissociation reaction of the α,ω-diacetoxypolydimethylpolysiloxanes or of the branched acetoxypolysiloxanes which may take place under the conditions of analysis by gas chromatography (regarding the redissociation reaction, see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O-Metal Derivates of Organic Hydroxy Compounds p. 162 ff.).

Preferably, for component A of formula (I), polyether polyols selected from polyether diols, polyether polyols or mixtures of polyether diols and polyether polyols are used.

The polyether polyols are preferably prepared by addition of alkylene oxides, according to the invention preferably ethylene oxide, propylene oxide, butylene oxide, styrene oxide, preferably mixed products composed of at least two monomer units, especially of ethylene oxide and propylene oxide, onto polyhydric starter alcohols of the general formula

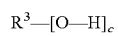

in which
R³=an e-valent hydrocarbon radical and e=2 to 6, preferably can be 2 to 3, according to the alkoxylation methods known in the related art. Starter alcohols that can be used are in principle all straight-chain or branched alcohols that are at least dihydric. According to the invention, preference is given to di- and/or trihydric alcohols such as in particular ethanediol, propanediol, butanediol, hexanediol, trimethylolpropane, which can be used alone or as a mixture.

In a preferred embodiment, the polyether polyols essentially consist of oxyethylene units or oxypropylene units, preference being given to mixed oxyethylene and oxypropylene units with an oxyethylene content of about 1 to 70 percent by weight and 99 to 30 percent by weight oxypropylene content, based on the total content of oxyalkylene units in the block.

According to the invention, preference is given to polyether diols in which ethylene oxide (EO) and propylene oxide (PO) are present as copolymers. Particular preference is given to EO/PO copolymers having a block-type construction and containing an EO content of about 1% to 30% by weight based on the total content of oxyalkylene units.

Preferably, for component C, C1 of formula (I), a polyether monool or a monohydric C1-C18 alcohol selected from methanol, ethanol, propanol, isopropanol, butanol and isobutanol is used.

The polyether monools can in principle be prepared in the same way as the polyether polyols, with the modification that the starter alcohols used are monofunctional compounds $Z^1$—OH, in which $Z^1$ can be an alkyl, alkylene, alkylaryl, aryl radical which optionally is branched and/or contains multiple bonds and which has 1 to 18 carbon atoms, preferably 1 to 10 carbon atoms.

Preferably, the molar ratio of end-equilibrated α,ω-diacetoxypolydimethylsiloxanes to the mixture consisting of at least one polyether polyol, preferably a polyether diol, and at least one polyether monool or at least one monohydric alcohol is in the range from 1.01 to 3.00, preferably in the range from 1.01 to 2.00, very particularly preferably in the range 1.01 to 1.50.

Preferably, the reaction, that is to say the reaction of end-equilibrated α,ω-diacetoxypolydimethylsiloxanes of formula (III) below with a mixture consisting of at least one polyether polyol, preferably a polyether diol, and at least one polyether monool or at least one monohydric alcohol, is conducted at temperatures of 20° C. to 180° C., preferably at temperatures of 60° C. to 150° C.

In a preferred embodiment, the bases to be used are selected from the alkali metal and/or alkaline earth metal carbonates and/or hydrogen carbonates and/or amines, very particularly preferably gaseous ammonia.

As known to those skilled in the art, the use of simple solid bases is also envisaged. Taking the poor solubility of the alkali metal/alkaline earth metal carbonates and/or hydrogen carbonates in the reaction system into account, according to the invention relatively high excesses of these are selected which correspond at least to a 2000-fold stoichiometric equivalent of the trifluoromethanesulfonic acid present in the α,ω-diacetoxypolydimethylsiloxane.

A known technical alternative for conducting the SiOC linking reaction is that of using buffer mixtures consisting of sodium trichloroacetate and trichloroacetic acid, or sodium acetate and trichloroacetic acid, both in each case dissolved in acetic acid. Here too, the amount of bases present in the buffer mixtures is typically such that it corresponds at least to the stoichiometric equivalent, preferably to a 2- to 3-fold stoichiometric equivalent of the trifluoromethanesulfonic acid present in the α,ω-diacetoxypolydimethylsiloxane used.

With respect to the amount of the acetic acid used for dissolving the buffer mixture, the unpublished inventions state that it is preferably selected such that it is sufficient to produce a clear buffer solution that is free of solid salt contents and which can be metered into the reaction matrix in a loss-free manner. Use amounts of acetic acid exceeding this are in contrast less critical for the successful performance of the process according to the invention, however large amounts are also not advantageous since they must then be removed again from the reaction matrix.

Taking account of the known tendency to condensation of acetoxysiloxanes, very particular preference is given to those bases which on account of their chemical composition do not introduce any water into the reaction system. Thus anhydrous carbonates are preferred over hydrogen carbonates and bases free from water of hydration are preferred over bases containing water of hydration.

In a preferred embodiment of the invention, inert solvents that can be used are alkanes, cycloalkanes, alkyl aromatics, end-capped polyethers and/or emollient esters, such as the esters derived from lauric acid, myristic acid, palmitic acid, stearic acid, oleic acid, isostearic acid, ricinoleic acid and behenic acid combined with cetyl, stearyl, isostearyl, oleyl, octyldodecyl, myristyl and behenyl alcohol or glycerol, preferably myristyl myristate.

In a preferred embodiment, the reaction with a mixture consisting of at least one polyether polyol, preferably a polyether diol, and at least one polyether monool or at least one monohydric alcohol is effected solventlessly.

Preferably, the weight-average molecular weight of each polysiloxane block (B) is between 650 to 6,500 g/mol, preferably 800 to 1,500 g/mol, particularly preferably 1,000 to 1,200 g/mol.

The polydimethylsiloxane-polyoxyalkylene block copolymer produced by the process according to the invention has a weight-average molecular weight of at least 2,000 g/mol to approx. 160,000 g/mol, preferably 4,000 g/mol to approx. 50,000 g/mol, in particular 5,000 g/mol to approx. 36,000 g/mol. The determination of the average molecular weights is based on the known methods of GPC analysis.

In order to guarantee increased storage stability, the linear SiOC-linked polyethersiloxanes produced by the process according to the invention can additionally also be admixed with small amounts of organic amines, such as for example N-methylmorpholine, triisopropanolamine or triethanolamine. This corresponds to a preferred embodiment of the invention.

The invention further provides SiOC-linked, linear polydimethylsiloxane-polyoxyalkylene block copolymers of formula (I) produced by the process according to the invention.

The invention also further provides for the use of the SiOC-linked, linear polydimethylsiloxane-polyoxyalkylene block copolymers according to the invention as interface-active additives for the production of PU foam stabilizers, defoamers, deaerating agents, emulsifiers, demulsifiers and paint and levelling additives.

It is likewise conceivable to use the SiOC-linked, linear polydimethylsiloxane-polyoxyalkylene block copolymers according to the invention for the production of diesel defoamers, of hydrophobizing agents, of polymer dispersions, of adhesives or sealants, of paper towels; of cleaning and care formulations for the household or for industrial applications, in particular for the production of fabric softeners, of cosmetic, pharmaceutical and dermatological compositions, in particular cosmetic cleansing and care formulations, hair treatment agents and hair aftertreatment agents; of construction material compositions, of thermoplastic shaped bodies.

The SiOC-linked, linear polydimethylsiloxane-polyoxyalkylene block copolymers according to the invention can also be used as processing aid in the extrusion of thermoplastics, as adjuvant in crop protection, as additive for the cleaning and care of hard surfaces, for the surface treatment of fibres, particles or fabrics, in particular for the finishing or impregnation of textiles, or in the coating of fillers.

Methods

The following examples serve only to elucidate this invention for those skilled in the art and do not constitute any restriction whatsoever of the claimed subject matter. The inventive determination of the water contents is in principle performed by the Karl Fischer method based on DIN 51777, DGF E-III 10 and DGF C-III 13a.

In the context of the present invention, the $^{29}Si$ NMR samples are analysed at a measurement frequency of 79.49 MHz in a Bruker Avance III spectrometer equipped with a 287430 sample head with gap width of 10 mm, dissolved at 22° C. in $CDCl_3$ and against a tetramethylsilane (TMS) external standard [d($^{29}Si$)=0.0 ppm]. $^{29}Si$ NMR spectroscopy was used for reaction monitoring in all examples.

The gas chromatograms are recorded on a GC instrument of the GC 7890B type from Agilent Technologies, equipped with a column of the HP-1 type; 30 m×0.32 mm ID×0.25 μm dF (Agilent Technologies no. 19091Z-413E) and hydrogen as carrier gas, with the following parameters:

Detector: FID; 310° C.
Injector: split; 290° C.
Mode: constant flow, 2 ml/min
Temperature programme: 60° C. at 8° C./min-150° C. at 40° C./min-300° C. 10 min.

The indicator of attaining the equilibrium employed is the total cycles content determined by gas chromatography and defined as the sum total of the D4, D5, and D6 contents, based on the siloxane matrix and ascertained after derivatization of the α,ω-diacetoxypolydimethylsiloxanes to give the corresponding α,ω-diisopropoxypolydimethylsiloxanes. The derivatization to give the α,ω-diisopropoxypolydimethylsiloxanes is chosen here deliberately in order to prevent a thermally induced redissociation reaction of the α,ω-diacetoxypolydimethylsiloxanes which may take place under the conditions of analysis by gas chromatography (regarding the redissociation reaction, see inter alia J. Pola et al., Collect. Czech. Chem. Commun. 1974, 39(5), 1169-1176 and also W. Simmler, Houben-Weyl, Methods of Organic Chemistry, Vol, VI/2, 4th Edition, O-Metal Derivates of Organic Hydroxy Compounds p. 162 ff.).

The polyether diols used have water contents of approx. 0.2% by mass and are used without further pre-drying. Employed toluene and, respectively, alkylbenzene ($C_{10}$-$C_{13}$) have a water content of 0.03% by mass and are likewise used without pre-drying.

The OH number of the polyether diols is determined according to DGF C-V 17 a (53) or according to Ph. Eur. 2.5.3 Method A, wherein the hydroxyl groups of the sample to be analysed are firstly acetylated with acetic anhydride in the presence of pyridine and then within the scope of a differential titration (blank sample, accounting for acetic anhydride excess) the liberated acetic acid is titrated as the consumption of KOH in mg per gram of polyether diol.

EXAMPLE a) Production of an End-Equilibrated, Acetoxy-Terminated, Linear Polydimethylsiloxane A 1000 ml four-neck flask equipped with a precision glass stirrer, an internal thermometer, and a reflux condenser on top was initially charged with 77.3 g (0.757 mol) of acetic anhydride together with 732.8 g (1.98 mol) of decamethylcyclopentasiloxane ($D_5$) and 24.3 g of acetic acid (3.0 percent by weight based on the total mass of the reactants) while stirring and this was admixed with 1.62 g (0.88 ml) of trifluoromethanesulfonic acid (0.2 percent by mass based on the total mixture) and swiftly heated to 150° C. The initially slightly cloudy reaction mixture was left at this temperature for 4 hours with continued stirring.

After cooling the mixture, a colourless, clear, mobile liquid was isolated, the $^{29}$Si NMR spectrum of which demonstrates the presence of Si-acetoxy groups in a yield of approx. 93% based on acetic anhydride used, corresponding to an α,ω-diacetoxypolydimethylsiloxane having an average total chain length of approx. 14.

Conversion of the α,ω-diacetoxypolydimethylsiloxane into the Corresponding α,ω-diisopropoxypolydimethylsiloxane for Analytical Characterization Immediately after the synthesis, in a 250 ml four-neck round-bottom flask equipped with a precision glass stirrer, an internal thermometer, and a reflux condenser on top, 50.0 g of this trifluoromethanesulfonic acid-acidified, equilibrated α,ω-diacetoxypolydimethylsiloxane were mixed together with 11.3 g of a molecular sieve-dried isopropanol at 22° C. with stirring. Gaseous ammonia ($NH_3$) was then introduced to the reaction mixture until alkaline reaction (moist universal indicator paper) and the mixture was then stirred at this temperature for a further 45 minutes. The precipitated salts were separated off using a fluted filter.

A colourless, clear liquid was isolated, whose accompanying $^{29}$Si NMR spectrum demonstrates the quantitative conversion of the α,ω-diacetoxypolydimethylsiloxane into an α,ω-diisopropoxypolydimethylsiloxane.

An aliquot of this α,ω-diisopropoxypolydimethylsiloxane was withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 4.09% | 2.62% | 0.86% | 7.57% | 4.60% | b) Production of an SiOC-Linked, Linear Polydimethylsiloxane-Polyoxyalkylene Block Copolymer of the Structural Type C—B-(AB)$_a$—C1

In a 250 ml four-neck flask equipped with a precision glass paddle stirrer, an internal thermometer, and a reflux condenser on top, a mixture of 67.9 g of a polyether diol having an average molar mass of 2671 g/mol (determined according to OH number) and having a ratio by mass of ethylene oxide to propylene oxide of 60:40 and 4.0 g of a butanol-started polyetherol (propylene oxide content of 100%) having a molar mass of 600 g/mol (molar mass determined according to OH number) was admixed while stirring with a solution of sodium acetate and trichloroacetic acid (0.06 g of sodium acetate (0.2% by weight based on the acetoxysiloxane) and 0.21 g of trichloroacetic acid (0.2% by weight based on the total mixture consisting of the polyether mixture and acetoxy siloxane)) in 5 g of acetic acid. This was followed by the addition of 28.0 g of the trifluoromethanesulfonic acid-acidified α,ω-diacetoxypolydimethylsiloxane from step a). The reaction mixture was heated to 70° C. and held at this temperature for 3 hours while stirring vigorously. The reflux condenser on top was replaced by a short distillation bridge and the reaction mixture was freed of volatiles at 100° C. bottom temperature and an applied auxiliary vacuum of 1 mbar.

After cooling down to 70° C., 17 g of isopropanol were added while stirring and the mixture was allowed to react at this temperature for 3 hours, and subsequently 2.4 g of sodium carbonate (2.0% by weight based on the total mixture) were added and the mixture was stirred for a further 2 hours.

After cooling to 25° C., the solid constituents were separated off using a fluted filter and excess isopropanol was removed from the clear filtrate by means of distillation on a rotary evaporator at 70 C./1 mbar auxiliary vacuum.

A colourless copolymer having a viscosity of 1750 mPas was isolated, the accompanying 29Si NMR spectrum of which confirms the target structure (20% isopropoxy-substituted Si end groups based on 80% of the SiOC bonds originating from the polyether Si linkage).

The invention claimed is:
1. A process for producing a SiOC-linked, linear polydimethylsiloxane-polyoxyalkylene block copolymer, the process comprising:
reacting an end-equilibrated α,ω-diacetoxypolydimethylsiloxane with a mixture comprising at least one polyether polyol and at least one polyether monool or at least one monohydric alcohol,
wherein the SiOC-linked, linear polydimethylsiloxane-polyoxyalkylene block copolymer is represented by formula (I)

$$C-B-(AB)_a-C1 \quad (I)$$

in which
A=a polyoxyalkylene block of the general formula $(C_nH_{2n}O)_b$—,
B=a polysiloxane block of the general formula $(SiR_2O)_c$—,
C, C1=identical or different alkoxypolyoxyalkylene radicals of general formula (II)

$$Z-O-[CH_2-CH(R^1)O]_d- \quad (II)$$

where Z=an alkyl, alkylene, aryl or alkylaryl radical,
or
C, C1=an alkyl radical with the proviso that C or C1 possesses an alkoxypolyoxyalkylene radical of general formula (II) where Z=hydrogen,
or
C, C1=identical or different alkoxypolyoxyalkylene radicals of general formula (II) where Z=a hydrogen with the proviso that C or C1 possesses an alkoxypolyoxyalkylene radical of general formula (II) where Z=an alkyl, alkylene, aryl or alkylaryl radical, R=identical or different $C_{1-4}$-alkyl radicals or phenyl radicals with the proviso that at least 90% of the radicals R are methyl radicals, $R^1$=identical or different hydrogen radicals, $C_{1-12}$-alkyl radicals or phenyl radicals, a=1 to 20, b=an average value of from 10 to 130, c=3 to 100, d=independently of one another in C/C1 values of from 2 to 20 with the proviso that the average value is in the range from 2 to <15, and n=2 to 12 with an average numerical value of from 2.7 to 4.0.

2. The process according to claim 1, wherein the end-equilibrated α,ω-diacetoxypolydimethylsiloxane is of formula (III)

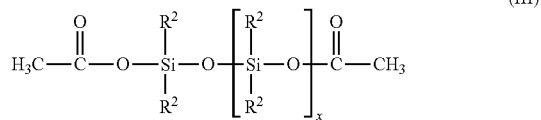

wherein $R^2$ is an alkyl radical having 1 to 4 carbon atoms or a phenyl radical, and x=2≤x≤250.

3. The process according to claim 2, wherein the end-equilibrated, α,ω-diacetoxypolydimethylsiloxane of formula (III) is obtainable from a reaction of a silane and/or siloxane bearing an alkoxy group, and/or a silane and/or siloxane bearing a hydroxy group, and/or a simple siloxane cycle and/or DT cycle, with acetic anhydride, superacid, and acetic acid.

4. The process according to claim 2, wherein, for a production of the end-equilibrated α,ω-diacetoxypolydimethylsiloxane of formula (III), a silane and/or siloxane bearing an alkoxy group and containing at least one T and/or Q group, and/or DT cycle are used.

5. The process according to claim 1, wherein, for A of formula (I), a polyether polyol, selected from the group consisting of polyether dials, polyether polyols, and a mixture thereof, is used.

6. The process according to claim 1, wherein, for C, C1 of formula (I), a polyether monool or a monohydric $C_1$-$C_{18}$ alcohol, selected from the group consisting of methanol, ethanol, propanol, isopropanol, butanol, isobutanol, and a mixture thereof, is used.

7. The process according to claim 1, wherein a molar ratio of the end-equilibrated α,ω-diacetoxypolydimethylsiloxane to the mixture is in a range from 1.01 to 3.00.

8. The process according to claim 1, wherein the reacting is conducted at temperatures of 20° C. to 180° C.

9. process according to claim 1, wherein a base to be used in the reaction is selected from the group consisting of alkali metal, alkaline earth metal carbonates, hydrogen carbonates, amines, and a combination thereof.

10. The process according to claim 1, wherein an inert solvent used in the reaction is selected from the group consisting of alkanes, cycloalkanes, alkyl aromatics, end-capped polyethers, emollient esters, and a combination thereof.

11. The process according to claim 1, wherein the reacting is effected solventlessly.

12. The process according to claim 1, wherein a weight-average molecular weight of the polysiloxane block (B) is between 650 to 6,500 g/mol.

13. The process according to claim 1, wherein the SiOC-linked, linear polydimethylsiloxane-polyoxyalkylene block copolymer has a weight-average molecular weight of at least 2,000 g/mol to approx. 160,000 g/mol.

14. The process according to claim 1, wherein the mixture comprises at least one polyether diol, and at least one polyether monool or at least one monohydric alcohol.

15. The process according to claim 2, wherein more than 90% of $R^2$ are methyl radicals, and x=10≤x≤30.

16. process according to claim 3, wherein superacid is trifluoromethanesulfonic acid.

* * * * *